United States Patent
Kurani

(10) Patent No.: US 10,437,439 B1
(45) Date of Patent: Oct. 8, 2019

(54) DYNAMIC WORKSPACE MODIFICATION

(71) Applicant: Symantec Corporation, Mountain View, CA (US)

(72) Inventor: Ankit Kurani, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 244 days.

(21) Appl. No.: 14/656,381

(22) Filed: Mar. 12, 2015

(51) Int. Cl.
*G06F 3/0484* (2013.01)
*G06F 3/0481* (2013.01)

(52) U.S. Cl.
CPC ...... *G06F 3/04842* (2013.01); *G06F 3/04817* (2013.01)

(58) Field of Classification Search
CPC .................. G06F 3/04842; G06F 3/04817
See application file for complete search history.

(56) References Cited

U.S. PATENT DOCUMENTS

| | | | |
|---|---|---|---|
| 7,137,141 B1* | 11/2006 | McClanahan | G06F 21/41 726/8 |
| 2003/0074393 A1* | 4/2003 | Peart | G06F 9/547 709/203 |
| 2004/0113949 A1* | 6/2004 | Cooper | G06F 9/44505 715/779 |
| 2007/0124373 A1* | 5/2007 | Chatterjee | G06Q 10/10 709/204 |
| 2010/0205545 A1* | 8/2010 | Dawson | G06Q 10/107 715/758 |
| 2011/0265188 A1* | 10/2011 | Ramaswamy | G06F 21/604 726/28 |
| 2012/0185910 A1* | 7/2012 | Miettinen | G06F 21/31 726/1 |
| 2013/0212703 A1* | 8/2013 | Ramesh | G06F 21/6218 726/28 |
| 2014/0006999 A1* | 1/2014 | Bukurak | G06F 3/0484 715/778 |
| 2014/0032647 A1* | 1/2014 | Nimura | H04W 4/02 709/203 |
| 2014/0181222 A1* | 6/2014 | Geris | H04L 51/24 709/206 |
| 2014/0366161 A1* | 12/2014 | Chien | H04W 12/08 726/28 |
| 2015/0294377 A1* | 10/2015 | Chow | G06Q 30/0263 705/347 |

OTHER PUBLICATIONS

U.S. Appl. No. 14/611,709, filed Feb. 2, 2015.

* cited by examiner

*Primary Examiner* — Anil K Bhargava
(74) *Attorney, Agent, or Firm* — Holland & Hart LLP

(57) ABSTRACT

A method for providing one or more dynamic modifications relating to an electronic device are described. In some embodiments, methods may include receiving a workspace framework, receiving one or more applications relating to the workspace framework, receiving user input, and modifying at least one of the workspace framework and the one or more applications based at least in part on receiving the user input.

19 Claims, 14 Drawing Sheets

DYNAMIC WORKSPACE MODIFICATION

BACKGROUND

Advancements in mobile device and mobile work applications present distinct challenges and create a need for additional security measures for enterprise electronic applications—including mobile device applications—and the information used by or stored on these applications and/or related device. The security-related problems also apply to user owned devices running the enterprise workspace or applications. For example, a user's device may receive a document containing confidential information that requires additional security measures to protect the confidential information. This additional security may include using a workspace designed to protect the mode of communication between applications or the information actually communicated.

Current devices, applications, and workspaces present multiple problems, including uncertainty by users as to which applications may function within a workspace, wasted time downloading multiple applications that may or may not function within a workspace, which applications may be available to one user or another, and/or incompatible or lacking relationships and functionality between the applications. Additionally, when multiple users use the same device they may require or have different access levels to different applications or within applications.

Because of current systems' limitations, a need exists for a user to quickly understand or identify available applications and to use the available applications to increase productivity. Accordingly, the present systems and methods address these and other related problems.

SUMMARY

The present systems and methods relate generally to dynamic modification of a workspace and/or an application relating to the workspace. In some embodiments, one or more applications and/or workspaces may be enterprise managed. The present systems and methods relate to modifying the workspace and/or the application by providing a visual indicator and/or a notification. The modifying of workspaces and/or applications may relate to size, shape, color, symbols, orientation, grouping, dividing, collecting subsets, and/or other modifications. Unless specifically noted otherwise, a workspace framework and a workspace are used interchangeably in this disclosure.

According to at least one embodiment, a method for providing a dynamic modification relating to an electronic device is disclosed. In some embodiments, the method may include receiving a workspace framework, receiving one or more applications relating to the workspace framework, receiving user input, and/or modifying at least one of the workspace framework and the one or more applications based at least in part on receiving the user input.

In some embodiments, modifying the one or more applications may include modifying a visual appearance of an icon of at least some of the one or more applications. In some embodiments, modifying the visual appearance of the icon may include modifying an outline of the icon. In some embodiments, modifying the visual appearance of the icon may include adding a symbol to the icon. In some embodiments, modifying the visual appearance of the icon may include modifying a portion of the icon. In some embodiments, modifying the visual appearance of the icon may include modifying a color of the icon. In some embodiments, modifying the visual appearance of the icon may include modifying a texture of the icon.

In some embodiments, modifying the workspace framework may include displaying a subset of the one or more applications. In some embodiments, modifying the workspace framework may include modifying a grouping of the one or more applications.

In some embodiments, modifying at least one of the workspace framework and the one or more applications may be based at least in part on comparing profile data associated with the user input to identify a permission level related to the workspace framework. In some embodiments, each of the one or more applications relating to the workspace framework may be a secure application.

In some embodiments, the method may include providing a notification based at least in part on the user input. In some embodiments, the method may include providing a notification based at least in part on the modifying. In some embodiments, the method may include authenticating the user input. In some embodiments, the user input may include at least one of a user identifier and a password. In some embodiments, modifying at least one of the workspace framework and the one or more applications may be performed based at least in part on receiving information from a remote server.

According to at least one embodiment, a computing device for providing a dynamic modification is disclosed. In some embodiments, the computing device may include a processor and/or memory in electronic communication with the processor. In some embodiments, the memory may store computer executable instructions that when executed by the processor cause the processor to perform steps, which steps may include receiving a workspace framework, receiving one or more applications relating to the workspace framework, receiving user input, and/or modifying at least one of the workspace framework and the one or more applications based at least in part on receiving the user input.

In some embodiments, modifying the one or more applications may include modifying an icon of at least some of the one or more applications. In some embodiments, modifying the one or more applications may include modifying an icon based at least in part on at least in part on a characteristic of another icon. In some embodiments, modifying the workspace framework may include differentiating a first subset of the one or more applications from a second subset of the one or more applications.

According to at least one embodiment, a non-transitory computer-readable storage medium storing computer executable instructions is disclosed. In some embodiments, the computer executable instructions when executed by a processor cause the processor to perform the steps of receiving a workspace framework, receiving one or more applications relating to the workspace framework, receiving user input, and/or modifying at least one of the workspace framework and the one or more applications based at least in part on receiving the user input.

Features from any of the above-mentioned or below-described embodiments may be used in combination with one another in accordance with the general principles described here. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments. These drawings are incorporated in this disclosure and are a part of the specification. Together with the following description, these drawings demonstrate and explain various principles of this disclosure.

Figure 1:
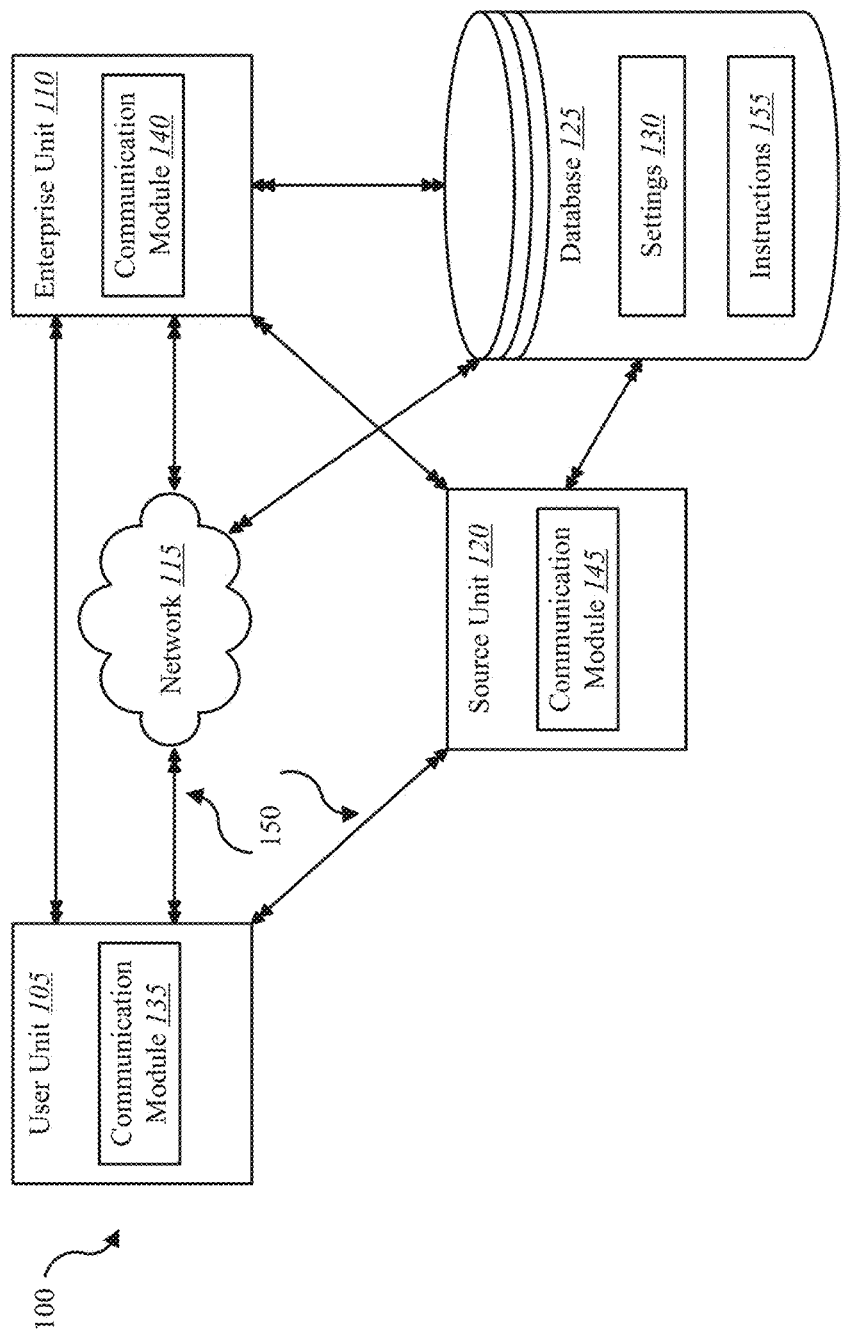
FIG. 1 is a block diagram illustrating embodiments in which the present systems and methods may be implemented.

While the embodiments described here are susceptible to various modifications and alternative forms, specific embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives falling within the scope of the claims.

DETAILED DESCRIPTION

The systems and methods described here relate to dynamic workspace modification operations. In some embodiments, the systems and methods described here relate to enterprise-managed device and/or applications, modifying a workspace and/or an application based at least in part on related information, and/or providing visual information and/or notifications relating to the modifications and/or other information.

In some embodiments, multiple users may have access to and use one or more applications, such as those within a workspace. These multiple users may have varying levels of access to the applications. For example, one user may have a higher access level than another, with the higher access level including administrator or supervisor access level while the other user has a senior employee or a junior employee access level. These varying access levels may create problems if the related workspaces and/or applications do not promptly notify the user about available and operational applications by causing the user to unsuccessfully attempt to use an application that she may not have access to and/or lead the user to download additional applications that may or may not be compatible with a workspace and/or other applications within a workspace in an attempt to carry out a desired task.

In some embodiments, some confidential documents may only be accessed by users having a certain access level. The administrator access level, for example, may be required to access specific confidential documents available through an enterprise's workspace or through one or more particular applications related to a workspace. Other users, such as a junior employee, may not have access to the application that permits viewing confidential documents and/or an application may not permit the user to perform a desired operation. But in some cases, the junior employee may be unaware of this restriction, have forgotten the restriction, and/or may need an update regarding access levels based on a recent advancement and/or certification. Thus, there may be many applications that appear available to a user, but the user may not have access to use at least some of the applications and needs help to identify which applications may enable the user to perform a desired function.

In some embodiments, at least some of the applications relating to a workspace may be secure applications. Among other features, these secure applications may incorporate one or more layers of security to protect confidential and/or sensitive user and/or enterprise information. For example, these additional security layers may incorporate one or more firewalls, encryption requirements, authentication requirements, password protection, key requirements, and/or other security measures. But, in some embodiments, a device and/or a workspace may have multiple similar applications, with some being "secure" and others not being secure. The present systems and methods fill a need in the art to quickly provide information to the user about which application is the secure, approved application and which is not.

In some embodiments, the present systems and methods include dynamic workspace modification, notification, and/or identification related to one or more workspaces and/or applications. In some embodiments, the present system and methods include modifying the workspace framework and/or the applications through visual appearance. In some embodiments, the present system and methods include modifying the workspace framework and/or the applications through organization. In some embodiments, the present system and methods include modifying the workspace framework and/or the applications through grouping. In some embodiments, the present system and methods include providing one or more notifications relating to modification of a workspace and/or an application, including requests and/or instructions after an initial modification.

In some embodiments, modifying the workspace framework and/or the applications may include modifying and/or providing an indicator about whether a user has provided sufficient information to gain access. For example, the workspace framework and/or the applications may be modified by indicating that a user has provided the required information to authenticate her credentials and/or identifying information. This authentication may enable the user to access the workspace framework and/or the applications. The workspace framework and/or the applications may be modified before, during, and/or after authentication to indicate that the user has gained access to (e.g., signed on, logged on, etc.) a workspace, an application, and/or a group of applications (including secure applications).

In some embodiments, the workspace framework and/or the applications may include one or more indicia relating to one or more features. For example, a symbol may relate to whether the user has been authenticated and/or gained access to desired features. In some embodiments, one or more indicia may be related to a status symbol associated with the workspace framework and/or the applications to indicate a current status of and/or an availability of a workspace and/or an application. As another example, one or more indicia may relate to one or more modification of a newly enabled/disabled and/or accessible/inaccessible workspace framework and/or application.

In some embodiments, additionally or alternatively, a user may receive a notification relating her access to the availability of a workspace and/or an application. For example, these notifications may relate to the device on which the workspace and/or the applications are included, other specific devices, and/or may be more general. Notification examples may include, but are not limited to, emails, text messages, instant messages, push notifications, written and audible announcements, tactile feedback, etc. In some embodiments, the notification may relate to changes in the availability of the workspace and/or the applications. For example, when a new application is available, the user may be notified of the availability and the user's access of the new application may be updated. As another example, when an previously-inaccessible application is accessible, the user may be notified and the user's access of the new application may be updated.

In some embodiments, a user device may receive a workspace and/or an application. One or both of these may be received from an enterprise itself (e.g., via an enterprise unit) and/or may be downloaded by the user from a central application location (e.g., an application store, a source unit). In some embodiments, the workspace and/or the application may be received from the enterprise unit without user input, which may include the enterprise pushing the workspace and/or the application to the user device. This automatic push may be performed by an enterprise that manages and/or has some other control over the user device, the workspace, and/or the application.

In some embodiments, the present systems and methods may be used in shared, multi-user device scenarios. Different users may have different permission levels, access rights, and/or other varying clearance to access different workspaces, applications, functions within a workspace and/or an application, and/or information relating to a workspace and/or application. For example, in a hospital setting a nurse may have access to some applications and/or application functionality but a doctor may have access to additional applications (including some that are unavailable to the nurse). Each user may have authentication data and/or a profile specific to their position, experience, enterprise-designation, training, education, certification, and/or skill level, among other things.

Unless specifically noted otherwise, reference to similarly named elements present in different components and/or modules of various systems may include the same functionality described for the other components and/or modules. For example, the description of user unit 105 discussed with reference to FIG. 1 applies to the description of user unit 205 with reference to FIG. 2 (and so on).

FIG. 1 illustrates an example of a system 100 in accordance with various aspects of this disclosure. System 100 may include a user unit 105, an enterprise unit 110, a network 115, a source unit 120, a database 125, connections 150, and/or other components and/or devices.

In some embodiments, user unit 105 may include a communication module 135 and enterprise unit 110 may include a communication module 140. Communication modules 135 and 140 may include the same and/or different capabilities and/or may perform the same and/or different functions.

The features described may relate to similar components, such as communication modules 135 and 140, may apply to other similar components and/or elements, and/or different components and/or elements. Or, in some cases, features described relating to similar components (communication modules 135 and 140) and/or elements may not apply to with respect to other similar components and/or elements.

In some embodiments, user unit 105 may include communication module 135. This communication module 135 may facilitate communication between user unit 105 and other components of system 100, including but not limited to enterprise unit 110, network 115, source unit 120, database 125, and/or others. In some embodiments, communication module 135 may facilitate communication between user unit 105 and elements of other system elements, such as communication module 140, communication module 145, settings 130, and/or instructions 155, among others.

In some embodiments, communication module 135 may facilitate communication via one or more connections 150, which may include direct connections (e.g., user unit 105 directly connected to enterprise unit 110) and/or indirect connections (e.g., user unit 105 connected to source unit 120 via enterprise unit 110). In some embodiments, communication module 135 may facilitate communication via one or more wired and/or wireless connections. In some embodiments, connections 150 may include wired, wireless, and/or both types of connections.

In some embodiments, user unit 105 may communicate through communication module 135 (or not, but instead directly) with enterprise unit 110, source unit 120, database 125, and/or other components and/or elements, via a communication path that includes a combination and/or one or more designated connections 150 and/or network 115. In some embodiments, all components and/or elements of system 100 may communicate using network 115. In some embodiments, all components and/or elements of system 100 may communicate using one or more connections 150.

Source unit 120 may be able to communicate with user unit 105 directly and/or indirectly. In some embodiments, user unit 105 may include a specially programmed computer, a specially programmed server, and/or both. User unit 105 may include a designated server and/or computer that may be protected in order to ensure protection of an entity's confidential information. In some embodiments, user unit 105 may be able to receive one or more workspaces and/or applications from source unit 120 that may have received one or more workspaces and/or applications from enterprise unit 110.

Alternatively, in some embodiments, user unit 105 may receive one or more workspaces and/or applications directly from enterprise unit 110. In some embodiments communication, including reception of one or more workspaces and/or applications, may be performed via network 115 from one or more devices such as user unit 105, enterprise unit 110, source unit 120, and/or database 125.

In some embodiments, network 115 may include cloud networks, local area networks (LAN), wide area networks (WAN), virtual private networks (VPN), wireless networks (using 802.11, for example), cellular networks (using 3G and/or LTE, for example), and/or other networks. In some embodiments, the network 115 may include the internet.

In some embodiments, one or more devices illustrated in system 100 may communicate with and/or link to database 125. Database 125 may include stored settings 130 and/or instructions 155. In some embodiments, instructions 155 may include instructions related to information generated, transmitted, received, authenticated, modified, and/or otherwise related to at least one of user unit 105, enterprise unit 110, network 115, source unit 120, and/or other components of system 100 and/or other systems. In some embodiments, relevant information and/or instructions 155 related to and/or based at least in part on a workspace, an application, authentication data, a visual indicator, a status, and/or other information relating to the present systems and methods may be included and/or stored in database 125.

In some embodiments, user unit 105, enterprise unit 110, source unit 120, and/or other components may access and/or receive settings 130 and/or instructions 155 in database 125 over network 115 and/or directly. Settings 130 and/or instructions 155 may include stored content. In some embodiments, database 125 may be internal or external to one or more components of system 100 (i.e., connected to a device through network 115 and/or connected directly to one or more devices of system 100). For example, at least a portion of database 125 may be internal and/or external to other components of system 100, such as user unit 105 and/or enterprise unit 110.

In some embodiments, settings 130 may include, but are not limited to, information relating to user preferences, enterprise preferences, passwords, keys, personal information, system information (e.g., model numbers, installation dates, etc.), performance characteristics and/or parameters, status updates, permission levels, profile information, protocols, symbols, indicia, icons, colors, textures, groupings, subsets, notifications, other content specifications of other components of system 100 including user unit 105, enterprise unit 110, source unit 120, and/or network 115, and/or information related to the system.

Instructions 155 may include instructions relating to modifying one or more workspaces and/or applications, among other instructions. These instructions may be sent to user unit 105 via enterprise unit 110 via a connection 150, to user unit 105 via network 115, directly and/or indirectly from a remote server (which may include one or more devices such as database 125, enterprise unit 110, and/or source unit 120), and/or to enterprise unit 110 via one or more other devices.

In some embodiments, enterprise unit 110 may generate an instruction to be sent from itself, database 125, and/or another device to user unit 105. In some embodiments, enterprise unit 110 may receive an instruction from one or more other devices such as database 125 that can then be sent from enterprise unit 110, database 125, and/or another device to user unit 105.

Figure 2:
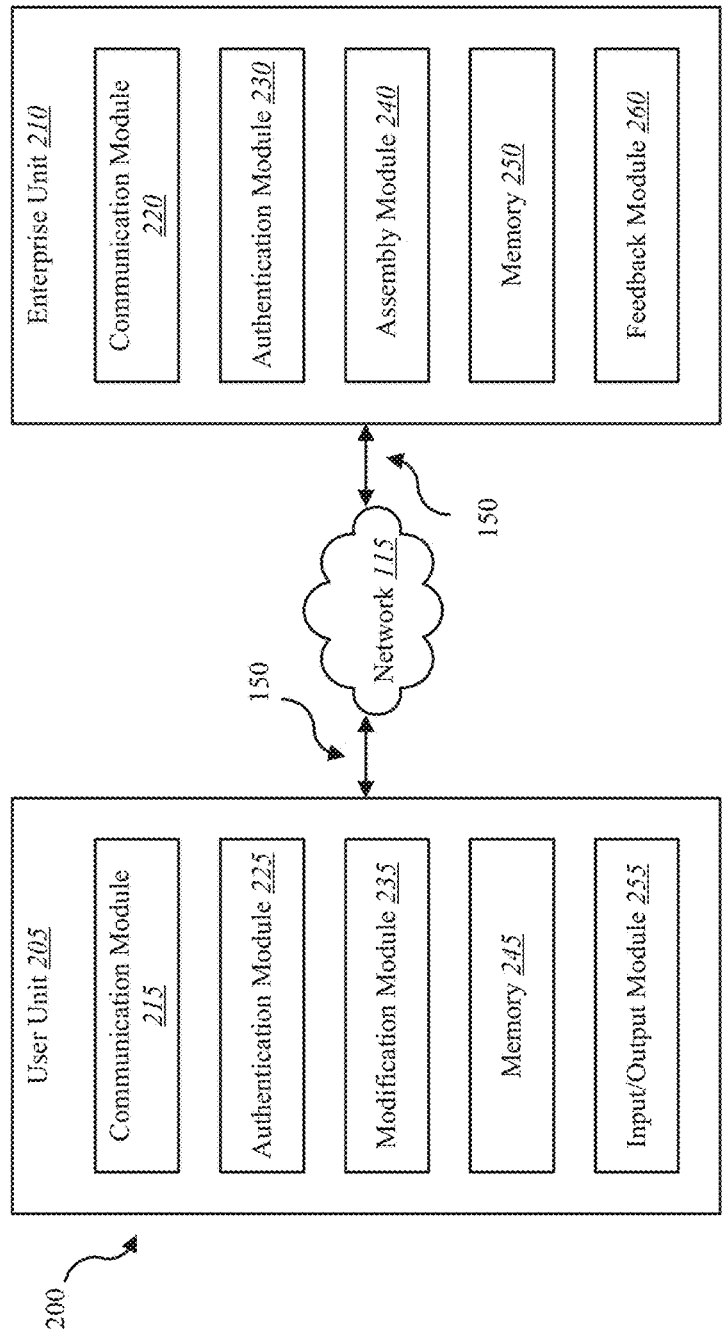
FIG. 2 is a block diagram illustrating embodiments in which the present systems and methods may be implemented.

FIG. 2 illustrates an example of a system 200 in accordance with various aspects of this disclosure. System 200 may include user unit 205, enterprise unit 210, network 115, connections 150, and/or other components. As stated elsewhere, references to user unit 205 relate to and/or incorporate discussion of other specifically-named user units (e.g., user unit 105) and/or other units that may include similar and/or related characteristics, and/or include similar and/or related functions.

In some embodiments, user unit 205 may include communication module 215, authentication module 225, modification module 235, memory 245, input/output module 255, and/or other modules. In some embodiments, enterprise unit 210 may include communication module 220, authentication module 230, assembly module 240, memory 250, feedback module 260, and/or other modules.

In some embodiments, user unit 205 and enterprise unit 210 may be examples of one and/or both of user unit 105 and/or enterprise unit 110 and/or other user units and/or enterprise units. In some embodiments, communication modules 215 and 220 may be examples of one and/or both of communication modules 135 and/or 140 and/or other communication modules. Additionally, other specific examples of distinct elements may be examples of additional distinct, related elements.

In some embodiments, communication module 215 may facilitate communication between user unit 205 and enterprise unit 210. This communication may include unidirectional, bidirectional, and/or combinations of both. In some embodiments, communication module 215 may facilitate communication between user unit 205 and enterprise unit 210 via one or more wired and/or wireless connections. In some embodiments, communication module 215 may facilitate communication between user unit 205 and enterprise unit 210 via one or more network connections. In some embodiments, communication module 215 may facilitate communication between user unit 205 and enterprise unit 210 via one or more secured communication connections. In some embodiments, communication module 215 may facilitate communication between user unit 205 and enterprise unit 210 via communication module 220 or more secured communication connections.

In some embodiments, communication module 215 may generate a notification, a request, a transmission, and/or another communication in response to receiving a signal from one or more other components and/or elements, including but not limited to authentication module 225, modification module 235, memory 245, input/output module 255, assembly module 240, and/or other components and/or elements of systems 200, 100, and/or others. In some embodiments, communication module 215 may generate a notification, a request, a transmission, and/or another communication to product a response relating to a signal relating to one or more other components and/or elements, including but not limited to authentication module 225, modification module 235, memory 245, input/output module 255, assembly module 240, and/or other components and/or elements of systems 200, 100, and/or others. These notifications, requests, transmissions, and/or other communications may be communicated between one or more components and/or elements of system 200, 100, and/or others.

In some embodiments, user unit 205 may include an authentication module 225 that may facilitate authenticating one or more users, profiles, user inputs, connections, devices, entities, sources, applications, confidential information, keys, certificates, etc. In some embodiments, authentication module 225 may facilitate secure communication between multiple entities, applications, and/or devices. For example, authentication module 225 may facilitate communication between a user unit (e.g., user unit 205) and a computing unit (e.g., source unit 120). As another example, authentication module 225 may facilitate communication between a user unit (e.g., user unit 205) and an enterprise unit (e.g., enterprise unit 210). In some embodiments, authentication may be performed using authentication module 225 via a device prompt, a stand-alone application, and/or based at least in part on when a user accesses the workspace and/or the application (secure or not), among other methods.

In some embodiments, enterprise unit 210 may include an assembly module 240 for assembling one or more information assemblies, which may include one or more workspaces, applications, protocols, instructions, and/or operating actions, among other things. In some embodiments, assembly module 240 may receive information from another source (e.g., source unit 120, database 125, etc.) and/or may utilize information received, programmed, analyzed, compiled, inputted, and/or otherwise modified by and/or for enterprise unit 210. In some embodiments, assembly module 240 is designed to aid in assembling a workspace that may include at least some secure applications.

In some embodiments, the applications may be assembled to interact, mesh, and/or work together. In some embodiments, a workspace may be designed to allow interaction and functionality between workspaces, a workspace and applications, multiple applications, and/or other setups. In some embodiments, assembly module 240 may interact with one or more modules of enterprise unit 210, user unit 205, and/or a combination from each. For example, enterprise unit 210 may push, transmit, send, receive, and/or otherwise communicate one or more workspaces and/or applications to or with user unit 205, which may be communicated via one or more modules, including communication modules 220 and/or 215.

In some embodiments, authentication module 225 may facilitate the secure use of a user unit 205, including but not limited to a workspace, an application, and/or some portion of one or both with user unit 2015. For example, authentication module 225 may facilitate communication between one application of a user unit (e.g., user unit 205) and another application of a user unit (e.g., user unit 205). As another example, when authentication module 225 authenticates information, user unit 205 may have certain functionalities and/or operations enabled, disabled, modified, and/or adjusted. In some embodiments, one or more of these operations may be performed via modification module 235. In some embodiments, when user A authenticates using a user name and/or a password, then certain workspaces and/or applications are enabled, disabled, and/or have their functionality adjusted via modification module 235 as compared to when user B authenticates.

In some embodiments, communication module 215 may facilitate secured communication based at least in part on communication with authentication module 225. Authentication module 225 may independently perform all actions relating to authentication relating to the systems and/or methods described in this disclosure. Or, in some embodiments, authentication module 225 may perform actions relating to authentication relating to the systems and/or methods described in this disclosure in conjunction with other components and/or elements, including communication module 215 or 220, authentication module 230, modification module 235, and/or assembly module 240, among others.

In some embodiments, authentication module 225 may authenticate information, including confidential information. In some embodiments, authentication module 225 may verify one or more authentication keys. In some embodiments, authentication module 225 may authenticate information received from a user (e.g., via input/output module 255), from a source unit (e.g., source unit 120), and/or from an enterprise (e.g., enterprise unit 210). In some embodiments, authentication module 225 authenticates input, such as user input, on its own. In some embodiments, authentication module 225 authenticates input, such as user input, by interacting with other modules of user unit 205 and/or other elements of enterprise unit 210, such as authentication module 230.

In some embodiments, authentication module 225 authenticates the information received. This information may include, but is not limited to a username, an identifier, a password, a validation code, a training completion, a certification, and/or other information. This information may be specific to, related to, and/or associated with a user, a device, and/or an enterprise, among other things. In some embodiments, authentication module 225 may receive confidential information from another device and/or entity. In some embodiments, authentication module 225 may receive one or more authentication keys from another device and/or entity.

In some embodiments, user unit 205 may include modification module 235.

Modification module 235 may modify one or more workspaces and/or applications related to user unit 205, enterprise unit 210, and/or other devices and/or related modules. In some embodiments, modification module 235 may itself modify one or more workspaces and/or applications, while in some embodiments, modification module 235 may perform modification in conjunction with other components and/or elements. In some embodiments, modifying an application may include modifying, adding, amending, altering, changing, and/or certifying one or more applications and/or workspaces, among other things. Modifications of a workspace and/or an application may be related to color, texture, size, display, grouping, subsets, symbols, status, shape, rotation, orientation, case type, font, symbols, overlays, and/or opacity, among other things.

In some embodiments, modifying one or more workspaces and/or applications may be based at least in part on comparing profile data associated with user input. Profile data characteristic may include, but are not limited to, title, seniority, length of employment, training, experience, granted permissions, relative position compared to one or more other people, personal information, username, password, etc. For example, a user may provide user input via a user unit (e.g., user unit 205), which may be processed, analyzed, and/or compared by a user unit, an enterprise unit, and/or some other another unit. In some embodiments, this comparison may be based on an identification of a permission level based at least in part on the user input (e.g., a user name, a password, an identifier, an employee's characteristics, etc.), which may relate to one or more workspace and/or applications. This comparison may be performed by a user unit, an enterprise unit, a source unit, a database, some combination of these, and/or another device and/or component.

As an example, user input may be compared to one or more requirements of a workspace and/or an application to determine if the user has sufficient permission to use the workspace, the application, and/or at least partially access selected functionality of one or more workspaces and/or applications. If a device, (e.g., a user unit, an enterprise unit, a source unit, etc.) determines a user does not have the required access and/or permission, then one or more results may occur. In some embodiments, the one or more workspaces and/or applications may be modified so that the user can only access a subset, an organized plurality, and/or a group.

In some embodiments, the one or more workspaces and/or applications may be modified based on a symbol and/or another visual identifier. In some embodiments, the one or more workspaces and/or applications may be modified in some way, and/or a notification may be sent to the user regarding her access or lack of access, provide a recommendation based on a permission level, and/or to explain a denial of access or lacking permission level, etc.

In some embodiments, user unit 205 and/or enterprise unit 210 may include memory 245 and/or 250. In some embodiments, memory may include computer executable instructions that can be executed by one or more processors. These one or more processors may be present in an element of user unit 205 (e.g., communication module 215, authentication module 225, and/or modification module 235), an element of enterprise unit 210 (e.g., communication module 220, authentication module 230, and/or assembly module 240), and/or one or more other components of system 200 or other systems (e.g., system 100).

In some embodiments, memory 245 may include computer executable instructions that may cause user unit 205 to interact with one or more components of system 200, such as enterprise unit 210, or vice-versa. In some embodiments, memory 245 and/or 250 may contain, among other code, the Basic Input-Output system (BIOS) which controls basic hardware operation such as the interaction with peripheral components or devices.

In some embodiments, user unit 205 and/or enterprise unit 210 may include input/output module 255 and/or feedback module 260. In some embodiments, input/output module 255 may receive input and/or output from a device, a user, a workspace, and/or an application, among other things. For example, in some embodiments, input/output module 255 may receive user information related to one or more other modules (e.g., authentication module 225) based on one or more of tactile, audible, written, and/or other feedback. In some embodiments, input/output module 255 may receive communications, including but not limited to authentication information, via a display screen, a microphone, and/or another device.

In some embodiments, this feedback module 260 may provide and/or receive feedback related to user unit 205, enterprise unit 210, and other components and/or elements of system 200 and/or others. In some embodiments, this feedback may include user-related feedback, device-related feedback, and/or system-related feedback, among others.

In some embodiments, the user-related feedback may be communicated to a user via a display and/or a message service. This user-related feedback may relate to user unit 205, network 115, enterprise unit 210, an application, another communication, an authentication, a modification, memory, and/or any other characteristics and/or functions related to a system, such as systems 100 and/or 200, among other things.

In some embodiments, the device-related feedback may be communicated to a user via a display or a message service. This device-related feedback may relate to user unit 205, network 115, enterprise unit 210, an application, another communication, an authentication, a modification, memory, and/or any other characteristics and/or functions related to a system, such as systems 100 and/or 200, among other things.

In some embodiments, the system-related feedback may be communicated to a user via a display or a message service. This system-related feedback may relate to user unit 205, network 115, enterprise unit 210, an application, another communication, an authentication, a modification, memory, and/or any other characteristics and/or functions related to a system, such as systems 100 and/or 200, among other things.

Figure 3:
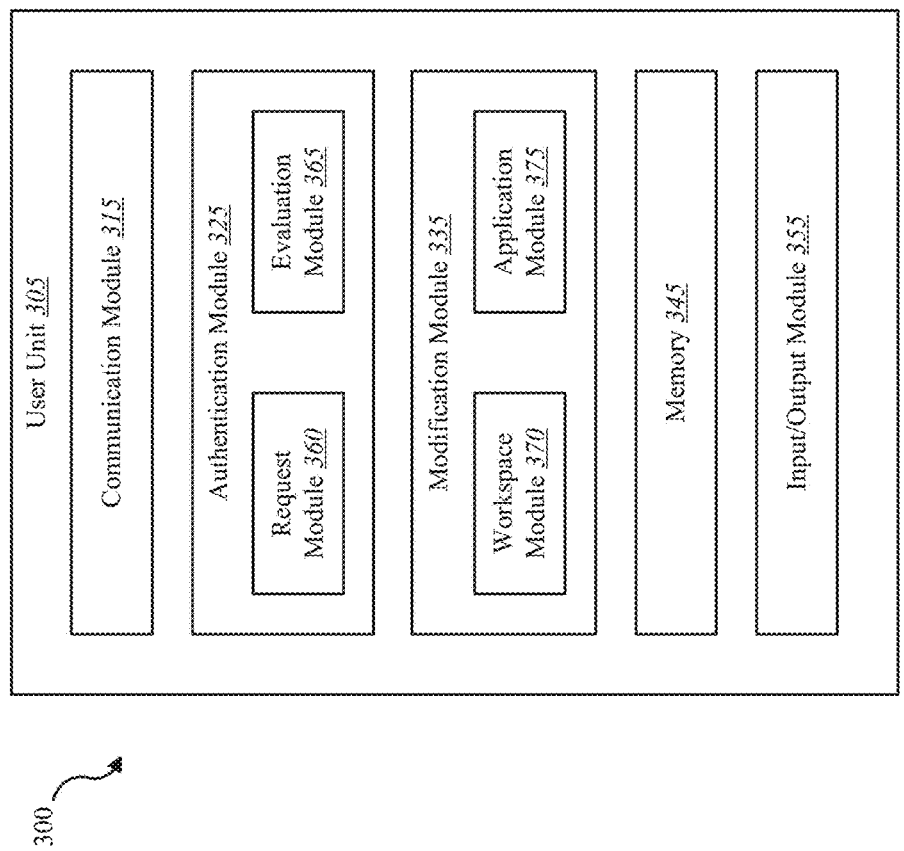
FIG. 3 is a diagram illustrating examples of a user unit related to the present systems and methods.

FIG. 3 illustrates an example of a system 300 in accordance with various aspects of this disclosure. System 300 may include user unit 305 and other components and/or elements (i.e., other components and/or elements discussed in this disclosure, such as those related to systems 100 and/or 200, among others). In some embodiments, system 300 may include communication module 315, authentication module 325, modification module 335, memory 345, input/output module 355, and/or other modules. As stated elsewhere, references to user unit 305 may relate to and incorporate discussion of other specifically-named user units (e.g., user units 105 and/or 205) and/or other units that may include similar or related characteristics and/or include similar or related functions (e.g., enterprise units 110 and/or 210, among others).

In some embodiments, authentication module 325 may include request module 360 and/or evaluation module 365, among others. Request module 360 may generate information, such as one or more requests, relating to one or more components of a system. For example, request module 360 may generate one or more requests for and/or relating to authentication information relating to a user unit and/or an enterprise unit. In some embodiments, request module 360 may receive one or more requests from another device (e.g., an enterprise unit) for information relating to authentication. For example, an enterprise unit may send a request to authentication module to request (via request module 360) information entered by the user (e.g., input/output module 355), from user unit 305, and/or another device.

In some embodiments, request module 360 may generate one or more requests for authentication and/or other information relating to authentication from another device (e.g., an enterprise unit) for information relating to authentication. This information may include, but is not limited to, user-related information, device-related information, system-related information, user profile information, permission and/or access level information, and/or other information. For example, a user unit may send a request via request module 360 and/or another to an enterprise device to authenticate certain information. In some embodiments, authentication may be performed by a user unit, a request unit, another unit, and/or some combination of both and may be dependent on user, device, and/or system information, among other sources.

In some embodiments, evaluation module 365 may evaluate one or more instances of authentication-related information relating to a system, including authentication information relating to user-inputted authentication and/or communications between one or more user units and/or enterprise units. For example, evaluation module 365 may evaluate one or more of a user name and/or a password—including private and/or public information—relating to a secure workspace, secure application, secure profile, secure permission level, etc. This evaluation may include comparing one or more pieces of information relating to authentication information to one or more known, stored, and/or related keys, passwords, profiles, permission, authentication information, and/or values.

Figure 4:
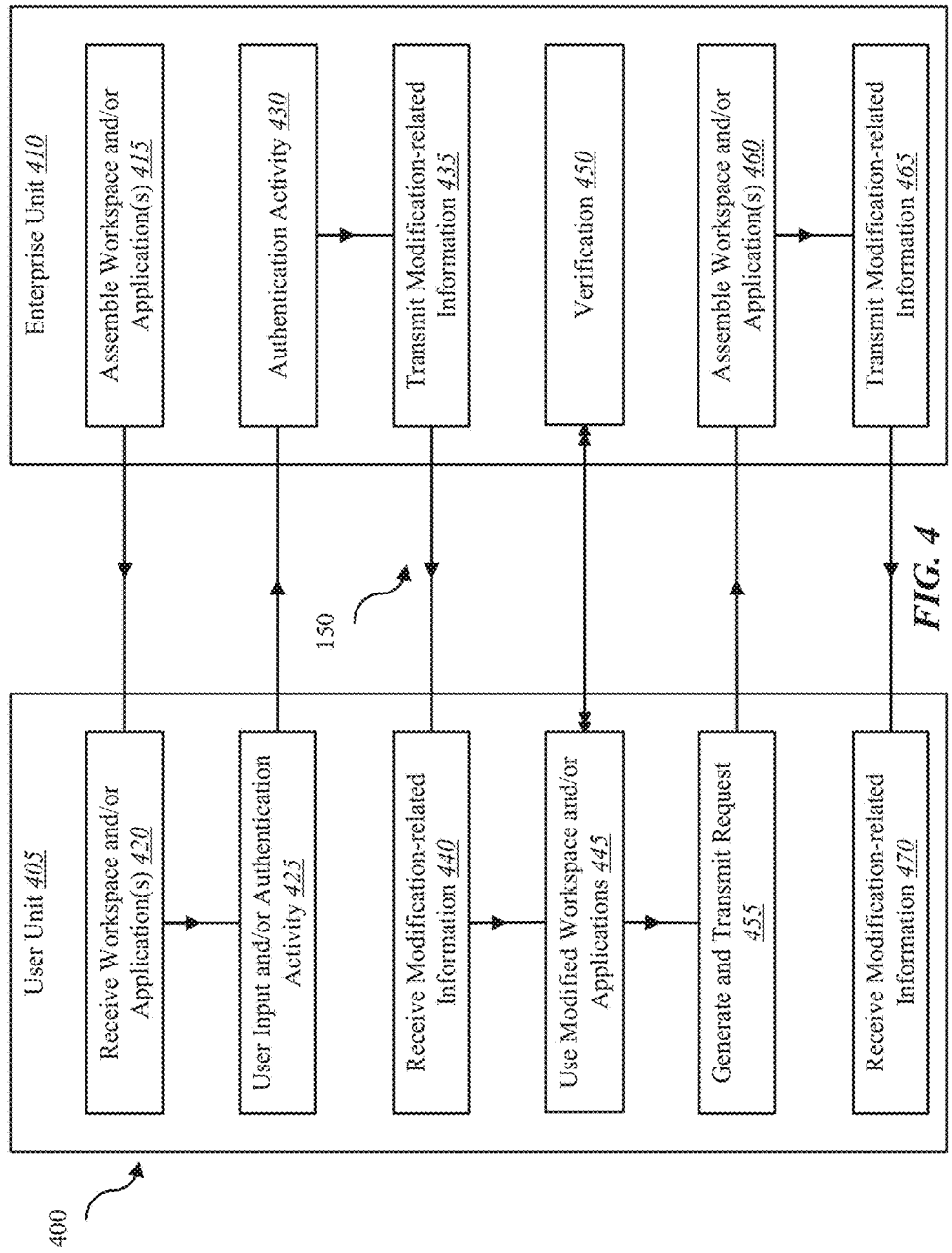
FIG. 4 is a block diagram illustrating embodiments in which the present systems and methods may be implemented.

FIG. 4 is a flow diagram illustrating embodiments of systems and methods 400 for dynamic modification relating to one or more workspaces and/or applications. In some embodiments, features related to system and methods 400 may be implemented in conjunction with one or more components, elements, and/or modules—such as one or more modification, assembly, authentication, communication, input/output, and/or feedback modules, among others. Enterprise unit 410 and user unit 405 may include the same and/or similar capabilities to those discussed for other systems and/or methods. FIG. 4 shows exemplary systems and methods that may relate to user unit 405 and/or enterprise unit 410. But these methods and related systems, may be implemented with greater and/or fewer components, elements, steps, actions, and/or modules than shown, referenced, and/or described.

At block 415, enterprise unit 410 may assemble and/or transmit one or more workspaces and/or applications to user unit 405. In some embodiments, these workspaces and/or applications may be finalized, unmodifiable, protected, secured, constructed in a certain way, grouped, or not. For example, one or more applications within a workspace may be finalized and secured while other applications and/or the application may not be finalized or may not be secured.

The transmission of the one or more workspaces and/or applications may be performed via a communication connection 150, which may be a wired and/or wireless link. This communication connection 150 may or may not include using a network. In addition, the communication connection 150 may be a secure communication link requiring authentication by user unit 405, enterprise unit 410, one or more other units related to the transmission, and/or some combination. The authentication may require using one or more pieces of authentication information.

At block 420, user unit 405 may receive the one or more workspaces and/or applications via a communication connection 150. In some embodiments, the received one or more workspaces and/or applications may include at least one application having authentication-related capabilities, features, requirements, and/or programming. In some embodiments, the received one or more workspaces and/or applications may only include secured applications assembled within one or more workspaces.

At block 425, user unit 405 may perform and/or initiate authentication-related activity. In some embodiments, this authentication activity may relate to user input, instructions, permission levels, and/or profile information, among other things, received by one or more of user unit 405, enterprise unit 410, and/or another device. In some embodiments, user unit 405 and/or some other device may initiate authentication. In some embodiments, enterprise unit 410 and/or some other device may initiate authentication.

At block 430, enterprise unit 410 may perform one or more operations related to authentication, including comparing user input and/or other information received from user unit 405 to information stored by and/or relating to enterprise unit 410 and/or a database. For example, enterprise unit 410 may compare a user's inputted user name and/or password, facial recognition, confidential information, and/or other related information to known values and/or characters. In some embodiments, enterprise unit 410 may then transmit one or more pieces of information relating to authentication activity, including that the authentication information is valid, invalid, associated with a user's given permission level and/or status, expired, and/or other information.

This authentication—depicted in blocks 425 and block 430—may be performed before, during and/or after one of: establishing a connection, transmission of one or more workspaces and/or applications, reception of one or more workspaces and/or applications, modification of one or more workspaces and/or applications, and/or other communication-related events depicted in FIG. 4 and/or understood from this disclosure.

At block 435, enterprise unit may generate and/or transmit modification-related information to one or more other devices including user unit 405 (which may receive such information at block 440). This modification-related information may include, but is not limited to, an instruction for modifications, user-preferred modifications, user-selected modifications, device-specific modifications, a menu of potential modifications, one or more modified workspaces and/or applications, and/or other information. The modifications relating to one or more workspaces and/or applications, may be performed by enterprise unit 410, user unit 405, and/or another device and/or a module within a device.

As described, at block 440, user unit 405 may receive the one or more workspaces and/or applications, among other information.

At block 445, one or more user units 405 (and/or another unit) may use one or more workspaces and/or applications. In some embodiments, these one or more workspaces and/or applications may have been transmitted and/or received via one or more different receiving events/transmissions stemming from one or more devices. These one or more modified workspaces and/or applications may include using a modification module to modify one or more applications in accordance with this disclosure.

In some embodiments, user unit 405 may include and/or associate one or more pieces of confidential information with at least one of the one or more applications and/or workspaces. This confidential information may include a signature key, an identification key, and/or other confidential information.

At block 450, user unit 405 and/or enterprise unit 410 may perform one or more verification operations. These operations may relate to any step discussed in this disclosure. In some embodiments, this verification step may include verifying authentication-related actions, reception of initial and/or modified one or more workspaces and/or applications, user input, system performance, etc.

At block 455, user unit 405 may transmit one or more requests to enterprise unit 410. In some embodiments, these requests may require authentication by a user and/or between devices to ensure a secure connection and/or operation of the one or more workspaces and/or applications. The transmission of the one or more requests may be performed via a communication connection 150, which may be a wired and/or wireless link. In some embodiments, this communication connection 150 may include using a network. In addition, the communication connection 150 may be a secure communication link require authentication by user unit 405, enterprise unit 410, by one or more other units involved in the transmission, and/or some combination. In some embodiments, the authentication may require using one or more authentication keys.

In some embodiments, these requests may be user-initiated. For example, a user may initiate a request for an additionally assembled and/or modified workspace and/or application based on one or more previously received and/or used workspaces and/or applications, and/or other information. As another example, user unit 405 may initiate a request for an additionally assembled and/or modified workspace and/or application based on one or more previously received and/or used workspaces and/or applications, and/or other information.

At block 460, enterprise unit 410 may receive the one or more requests and/or other information—that may or may not include modified workspaces and/or applications—via a communication connection 150. In some embodiments, based on the received information, including one or more requests, enterprise unit 410 may assemble and/or reassemble one or more workspaces and/or applications. This assembly and/or reassembly may include performing operations discussed throughout this disclose. For example, this assembly may include modifying the functionality of one or more applications, modifying the interaction between one or more applications and/or workspaces, assembling a new workspace based on a request and/or other information, and/or performing other operations.

At blocks 465 and 470, enterprise unit 410 may transmit modification—related information and user unit 405 may receive modification-related information.

It should be noted that only some variations of the exemplary systems are shown and/or described and that a person of ordinary skill in the art having a basic understanding of certain concepts will be able to implement the ideas disclosed here to perform application transmissions, assemblies, modifications, receptions, authentication, encryption, and/or other related functions disclosed in other variations. In some embodiments, some, most, all, and/or any other combination of the elements and/or components shown in FIGS. 1-3 (and the other FIGs.) may be related, connected, and/or in communication with each other. In some embodiments, some, most, all, and/or any other combination of the elements and/or components shown in FIGS. 1-3 (and the other FIGs.) may be omitted, combined, added to, and/or other related actions.

In some embodiments, any and/or all of these operations described may be performed by, or at, one or more of: a user unit, an enterprise unit, a source unit, a network, a database, and/or other components, elements, and/or modules.

Figure 5:
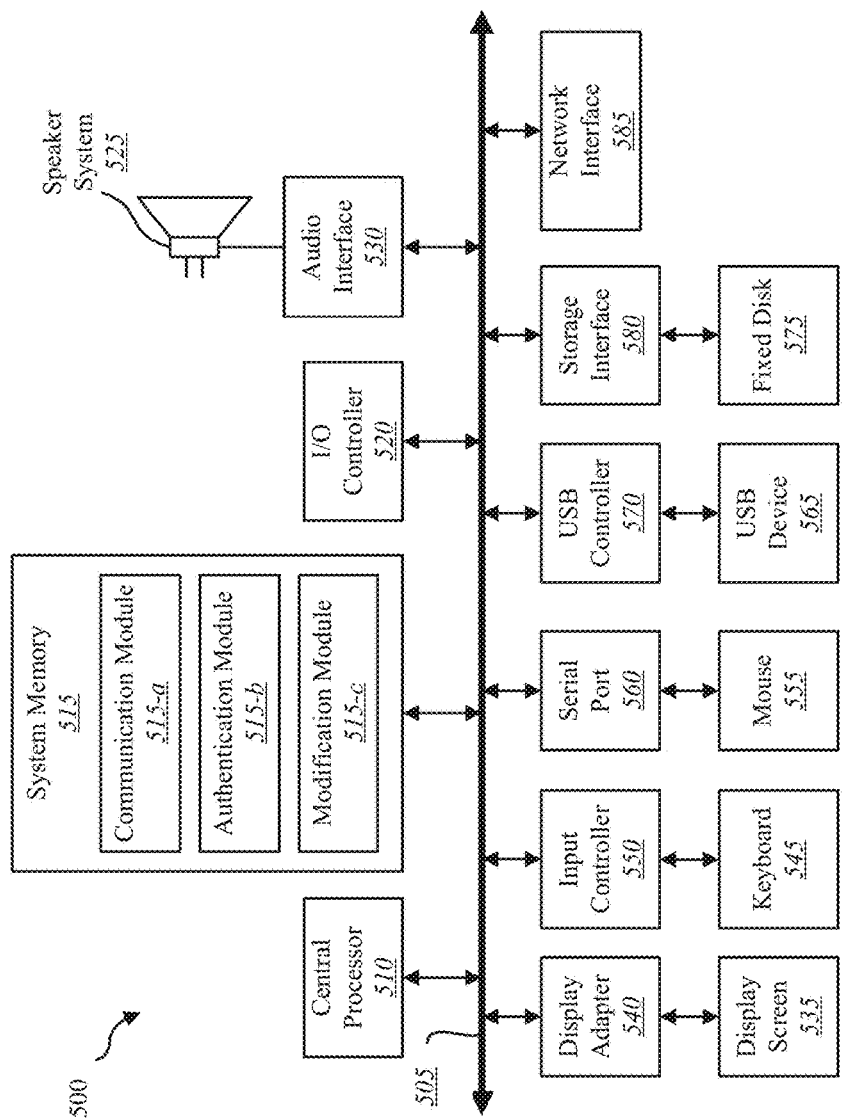
FIG. 5 depicts a block diagram of embodiments of a system suitable for implementing embodiments of the present systems and methods.

FIG. 5 depicts a block diagram of a controller 500 suitable for implementing the present systems and methods. The controller 500 may be an example of and/or relate to a user unit, an enterprise unit, a computing unit, a source unit and/or other units. In some embodiments, controller 500 includes a bus 505 which interconnects components and/or elements of controller 500 including one or more of: a central processor 510, a system memory 515 (which may include random access memory (RAM), read-only memory (ROM), flash RAM, and/or similar memory), an input/output controller 520, an external audio device, such as a speaker system 525 via an audio output interface 530, an external device, such as a display screen 535 via display adapter 540, an input device 545 (e.g., remote control device interfaced with an input controller 550), a USB device 565 (in some cases interfaced with a USB controller 570), and a storage interface 580. Also included are at least one sensor 555 connected to bus 505 through a sensor controller 560 and a network interface 585 (in some cases coupled directly to bus 505).

Bus 505 allows data communication between central processor 510, system memory 515 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different modules (e.g., communication, authentication, modification, assembly, input/output, feedback, communication module 515-a, authentication module 515-b, modification module 515-c, and/or others) to implement the present systems and methods may be stored within the system memory 515. Applications resident with controller 500 may be generally stored on and accessed via a non-transitory computer readable medium, such as a hard disk drive (e.g., fixed disk 575) and/or other storage medium. Additionally, applications may be in the form of electronic signals modulated in accordance with the application and data communication technology when accessed via interface 585.

Storage interface 580, as with the other storage interfaces of controller 500, can connect to a standard computer readable medium for storage and/or retrieval of information—such as a fixed disk 575. Fixed disk 575 may be a part of controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to controller 500 wirelessly via network interface 585.

Many other devices or subsystems may be connected in a similar manner (e.g., computing device, remote devices, transmitters, etc.). In addition, all of the devices shown in FIG. 5 need not be present to practice the disclosed systems and methods. The devices and subsystems can be interconnected in different ways from that shown in FIG. 5. Some aspects of some operations of a system, such as that shown in FIG. 5, may be readily known in the art and are not discussed in detail in this application.

Code to implement the present disclosure can be stored in a non-transitory computer-readable medium such as one or more of system memory 515 or fixed disk 575. The operating system provided on controller 500 may be iOS®, ANDROID®, MS-DOS®, MS-WINDOWS®, OS/2®, UNIX®, LINUX®, and/or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

Figure 6:
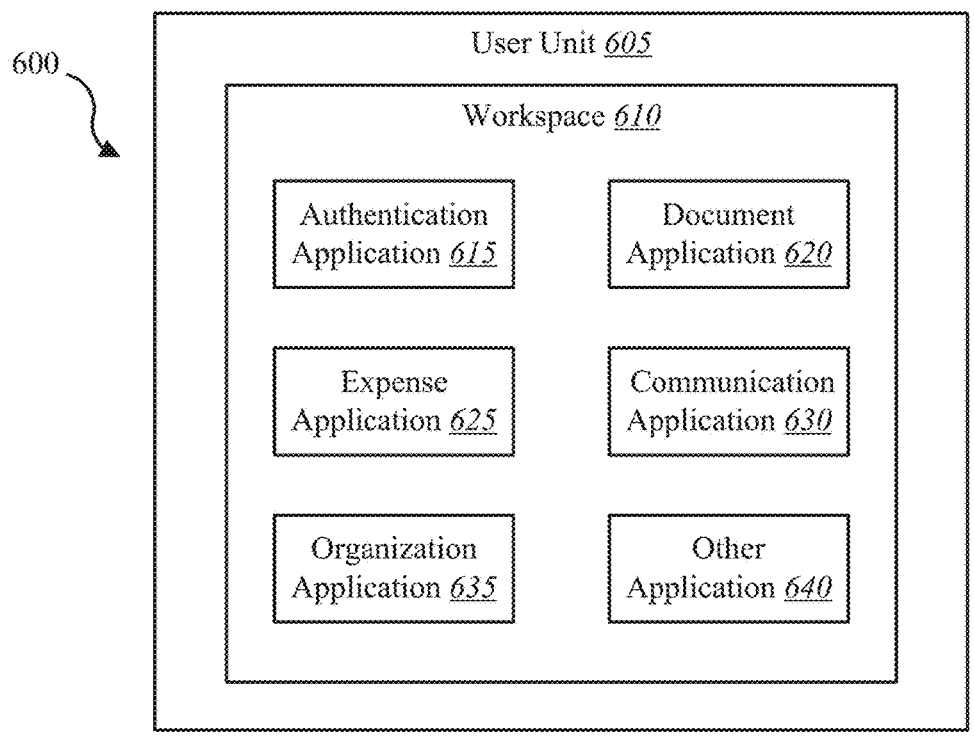
FIG. 6 is a diagram illustrating examples of a user unit related to the present systems and methods.

FIG. 6 shows an exemplary user unit 605 in accordance with some of the present methods and/or systems. In some embodiments, user unit 605 may include one or more workspaces, such as workspace 610. In some embodiments, workspace 610 may include one or more applications that may perform one or more related functions as described in this disclosure. Exemplary applications that may relate to workspace 610 may include authentication application 615, document application 620, expense application 625, communication application 630, organization application 635, and/or other application 640, among others. The applications shown in FIG. 6 are merely exemplary and other different and/or related applications having various functions are specifically contemplated.

In some embodiments, applications 615-640 (among others) may interface and/or interact with each other. For example, authentication application 615 may be a standalone authentication application to authenticate certain information related to a user, a user-profile, user input, a device, and/or other embodiments described in this disclosure. Alternatively, and/or additionally, authentication application 615 may perform authentication when based on a user accessing another application (e.g., expense application 625). In this way, the authentication application 615 may act as an overlay and/or an initial layer that must be satisfied to access the one or more other applications, including those may enable and/or provide access to secure information.

As another example, document application 620 may facilitate viewing confidential expense information stored in and/or related to expense application 625. In some embodiments, each of these applications may be secure and employ an additional security layer to protect the information accessible in each and/or both applications, and/or other applications and/or workspaces.

In some embodiments, one or more features of the present systems and methods may include using single sign on (SSO) characteristics. In some embodiments, authentication application 615 may facilitate a SSO operation by permitting a user to sign on and/or authenticate once during a predetermined period (e.g., a battery charge, a day, a week, a month, and/or other quantitative and/or qualitative factors) and gain access to the one or more workspaces and/or applications based on this SSO operation. In some embodiments, the system may not employ a SSO operation, but may initiate multiple requests for each of one or more workspaces and/or applications.

Figure 7:
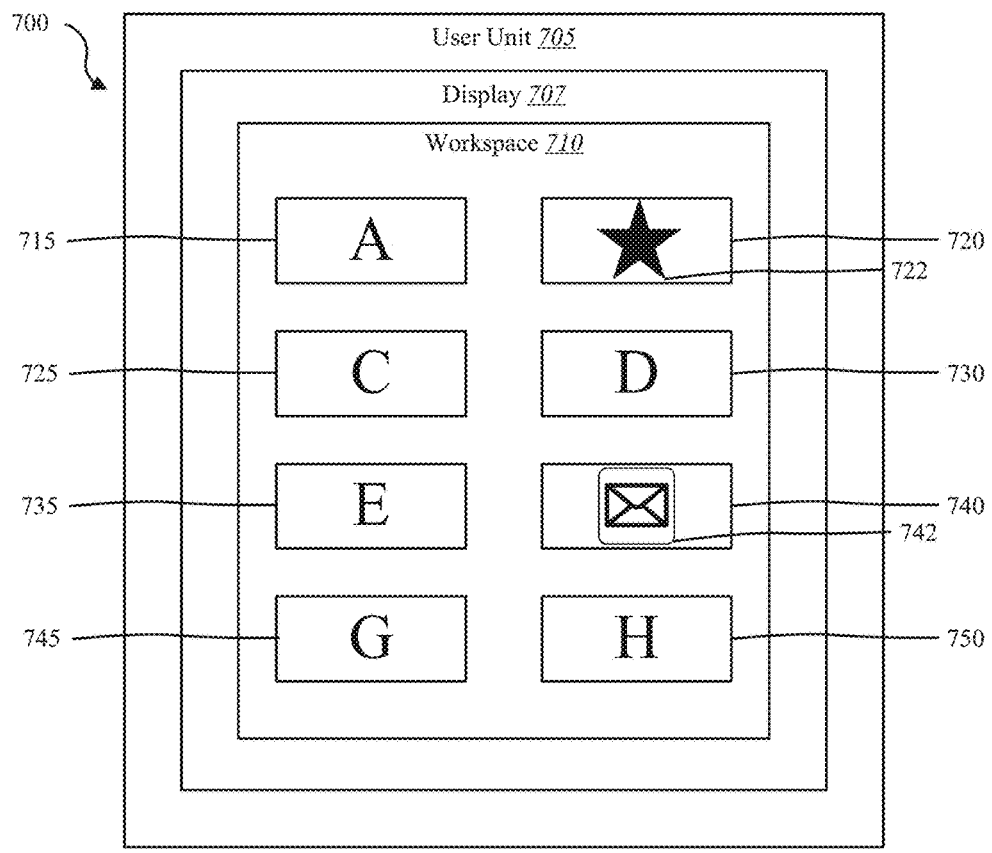
FIG. 7 is a diagram illustrating examples of a user unit related to the present systems and methods.

FIG. 7 shows an exemplary user unit 705 in accordance with some of the present methods and/or systems. In some embodiments, user unit 705 may include one or more displays, such as display 707, which may or may not be a touch screen device. In some embodiments, user unit 705 may include one or more workspaces, such as workspace 710. In some embodiments, workspace 710 may include one or more applications that may perform one or more related functions as described in this disclosure.

In some embodiments, each of the one or more applications may be, be related to, and/or be associated with one or more icons (e.g., icons 715, 720, 725, 730, 735, 740, 745, 750, etc.). In some embodiments, each of the one or more icons may be, be related to, and/or be associated with one or more symbols and/or indicia (e.g., 722, 742). In some embodiments the one or more icons may be related to one or more workspaces and/or applications relating to those received from and/or by an enterprise unit and/or a user unit, among other devices, as described in this disclosure.

Figure 8:
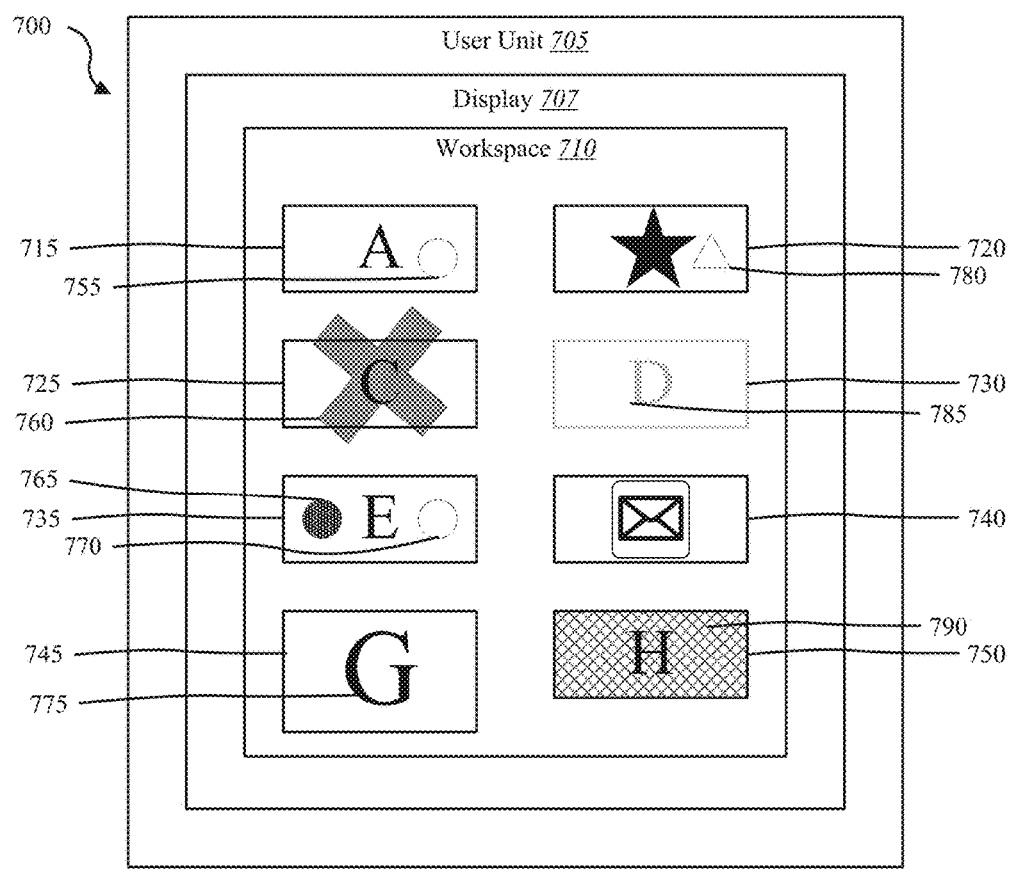
FIG. 8 is a diagram illustrating examples of a user unit related to the present systems and methods.

FIG. 8 shows an exemplary user unit 705 in accordance with some of the present methods and/or systems. In some embodiments, the applications and/or the icons relating to user unit 705 may be modified. In some embodiments, an enterprise unit may perform the modification. In some embodiments, a user unit may perform the modification. In some embodiments, a combination of an enterprise unit, a user unit, a source unit, and/or a database may perform the modification. For example, a user unit may display one or more modified applications that may have been modified by the user unit (e.g., 705) based on modification-related information received from the enterprise unit. This modification-related information may include, but is not limited to, one or more instructions, new workspaces, new applications, updated workspaces, updated applications, updated user-related information, updated device-related information, updated system-related information, and/or customizable workspaces and/or applications, among other information.

In some embodiments, the present systems and methods include dynamically modifying one or more workspaces and/or applications, which may be enterprise and/or user managed. In some embodiments, this dynamic modification may include modifying the same workspace and/or application over time, different workspaces and/or applications overtime, and/or some combination. In some embodiments, the dynamic modifications may be based at least in part on a user, a user profile, user input, permission level, security measures, protection layering, responsibilities, tasks, work groups, teams, devices, enterprise subsets, enterprise preferences and/or settings, user preferences and/or settings, authentication information, and/or encryption information, among other things.

FIG. 8 shows exemplary modifications that may be performed on one or more icons, which may be related to one or more workspaces and/or applications. These exemplary modifications do not illustrate every possible modification but merely provide examples for a person of ordinary skill in the art. Moreover, these one or more modifications may be performed in combination with each other and/or with other information (such as written text-based notifications, audio-based notifications, and/or other notifications or combinations of notifications).

In some embodiments, modifying one or more icons may include adding one or more other symbols as part of an icon. These symbols may include user-customizable symbols and/or symbols specific to a device, a user, a user profile, a system, and/or other embodiments. In some embodiments, these symbols may be filled, unfilled, outlines, broken/dashed lines, textures, colors, multi-design, 3-D rendered (giving the appearance of depth), some combination, and/or other characteristics.

As shown in FIG. 8, in some embodiments, these symbols may be placed beside (e.g., 755, 765, 770, 780) an icon's one or more initial design features (illustrated by alphabet letters, a star, and an envelope in FIGS. 7 and 8). In some embodiments, these symbols may be overlaid on an icon's one or more initial design features (e.g., 760), and may include varying opacity, depictions, colors, patterns, shapes, and/or other features. In some embodiments, each icon may incorporate the same symbol and/or a different symbol. For example, each icon may incorporate a unique identifier (comparing symbol 755 of icon 715 to symbol 780 of icon 720). As another example, each icon may incorporate the same and/or similar identifiers (comparing symbol 755 of icon 715 to symbol 770 to icon 735).

As another example, each icon may incorporate one or more symbols (e.g., icon 735). In some embodiments, an icon may include a symbol performing different functions and/or conveying different information. A modified icon may include a symbol denoting a status of a device, a user profile, a workspace, authentication, encryption, accessibility, and/or an application. For example, symbol 765 may graphically indicate whether a user has been fully, partially, or not authenticated. In some embodiments, color, shape, shading, pattern, texture, and/or other characteristic of a modified icon may readily visually indicate an authentication status. For example, symbol 765 may include a shaded circle if the user has been authenticated but may include a non-shaded circle if the user has not been authenticated. For example, symbol 765 may include a green circle if the user has been authenticated but may include a yellow circle if the user has not been authenticated.

In some embodiments, the modification of the icon may include modifying the relative size of the icon itself, a main design feature, and/or a portion of an icon. For example, icon 745 illustrates how a size of the icon may be increased relative to its own original size and/or other applications' and/or workspaces' original size. As another example, element 775 illustrates how a size of a portion of an icon may be increased relative to its own original portion size and/or other applications' original portion size. Other adjustments and/or modifications are contemplated, and may include but are not limited to, rotations, mirroring, colorations, and/or sizing of an icon and/or one or more portions.

In some embodiments, the modification of the icon may include modifying the relative shading, color, and/or depiction of the icon, the outline of the icon, a portion of the icon, and/or one or more design elements. For example, icon 730 illustrates an example of how an icon and/or a portion of the icon (e.g., 785) may be modified by being greyed-out and/or adjusted. In some embodiments, this modification may include changing a shade of the initially-used design including one or more colors to a grayscale and/or a black-and-white version. In some embodiments, this modification may include changing a shade of the initially-used design including color to a relatively lighter and/or a relatively darker version, providing a visual indicator.

In some embodiments, one or more of the modifications may occur based on user input, user preferences, user profile data, historical data (including selection and/or options used for one or more previous modifications and/or other functions, enterprise selections, enterprise preferences, device operations, device parameters, device limitations, system operations, system parameters, system limitations, and/or other information. For example, one or more icons may be modified based on the occurrence of an authentication action based on user input received at one or more devices, operations performed by one or more devices, and/or information received by one or more devices, including but not limited to a user unit, an enterprise unit, a source unit, a database, and/or another device, among others.

As another example, element 775 illustrates how a size of a portion of an icon may be increased relative to its own original portion size and/or other applications' original portion size. Other adjustments and/or modifications are contemplated, and may include but are not limited to, rotations, mirroring, colorations, and/or sizing of an icon and/or one or more portions.

As another example, element 790 illustrates how a texture of at least a portion of an icon may be modified relative to its own original texture. In some embodiments, this texture and/or appearance modification may be performed on one or more portions of an icon and/or the entire icon. Various texture modifications may be used, including but not limited to crosshatching, intersecting designs, vertical designs, horizontal designs, pattern designs, 3D designs, combinations, and/or others.

In some embodiments, these one or more modifications may include changing a portion of an icon in one or more ways while changing another portion of an icon in one or more other ways.

Figure 9:
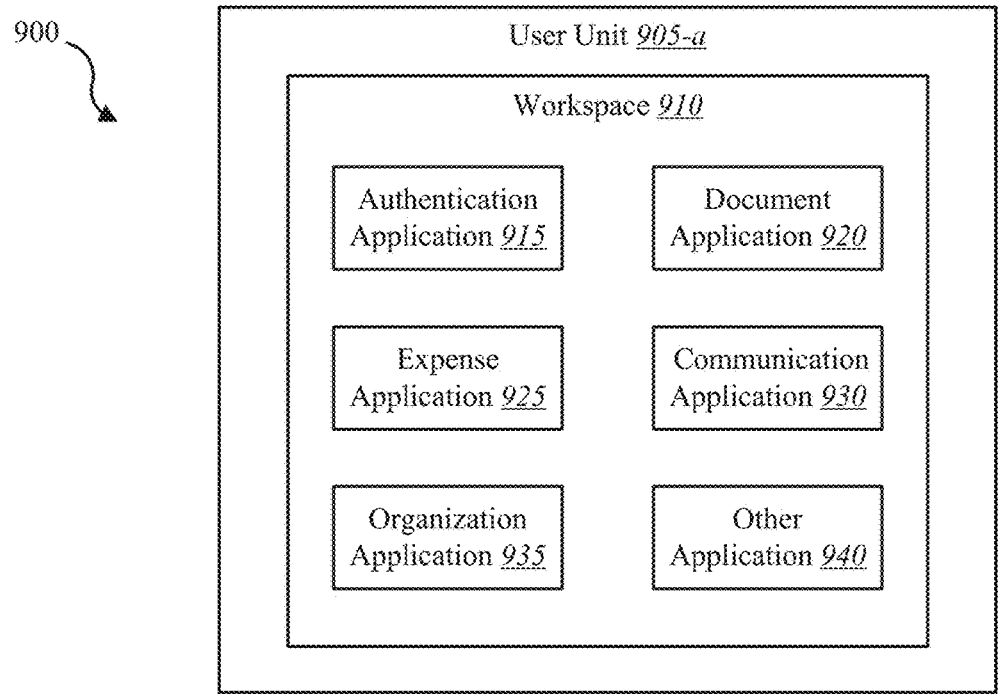
FIG. 9 is a diagram illustrating examples of a user unit related to the present systems and methods.

FIG. 9 shows an exemplary user unit 905 in accordance with some of the present methods and/or systems. In some embodiments, user unit 905 may include one or more workspaces, such as workspace 910. In some embodiments, workspace 910 may include one or more applications that may perform one or more related functions as describe in this disclosure. Exemplary applications that may relate to workspace 910 may include authentication application 915, document application 920, expense application 925, communication application 930, organization application 935, and/or other application 940. The applications shown in FIG. 9 are merely exemplary and other different and/or related applications are specifically contemplated.

Figure 10:
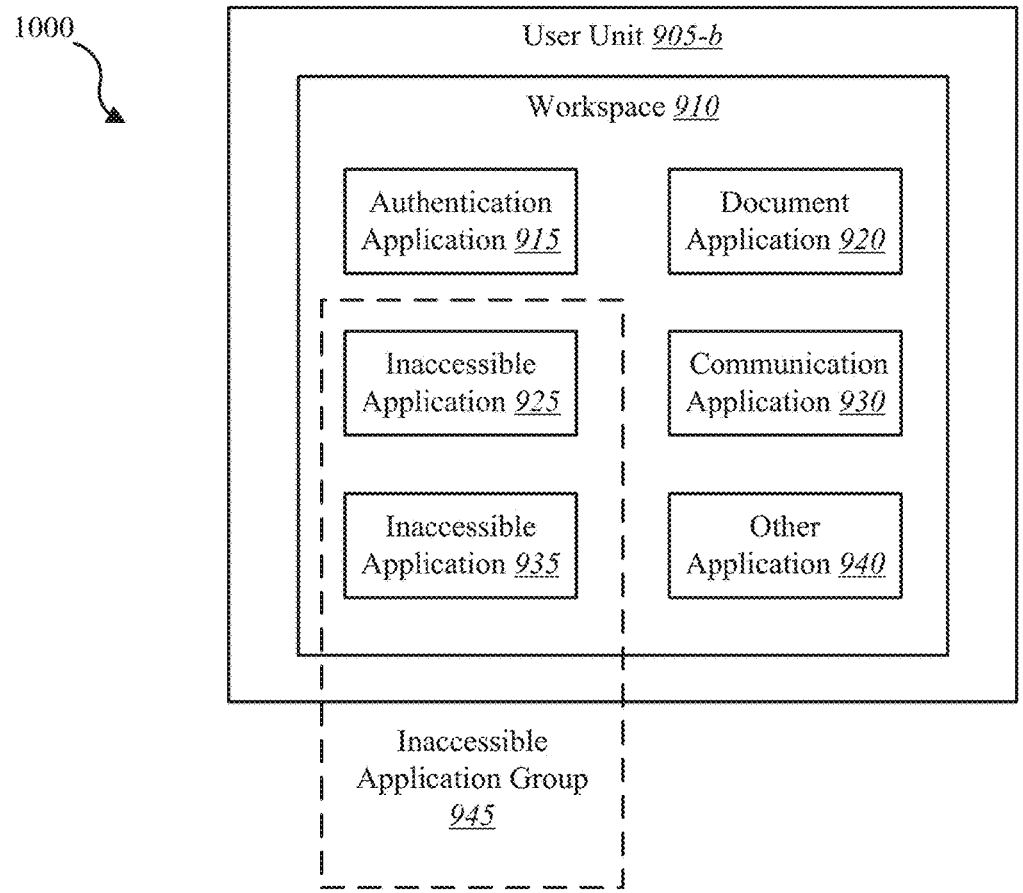
FIG. 10 is a diagram illustrating examples of a user unit related to the present systems and methods.

In some embodiments, as shown by comparing FIG. 10 with FIG. 9, one or more applications and/or workspaces may be modified based on one or more parameters. For example, one or more applications (e.g., applications 925 and 935) may be modified from a potentially-accessible status to an inaccessible status based on one or more events and/or actions.

These one or more events and/or actions may relate to operations performed by a user, a user unit, an enterprise unit, a database, and/or another device, or combinations.

In some embodiments, in response to a device and/or a system authenticating (or not authenticating) based on or more pieces of information, one or more workspaces and/or applications may be modified. In some embodiments, modifying one or more workspaces and/or applications may include differentiating a first subset of the one or more applications from a second subset of the one or more workspaces and/or applications using one or more methods. In some embodiments, now-inaccessible applications may be grouped in a subset and/or a designated grouping (e.g., inaccessible application group 945). This dividing, sorting by subset, grouping, partitioning, and/or organizing may inform the user about accessible or inaccessible applications based at least in part on some provided information. In some embodiments, such information may include, but is not limited to, authentication information.

A grouping may include, among others things, arranging the icons in an organized orientation based on their accessibility, function, and/or one or more other features. For example, when user A authenticates with via facial recognition and/or some other identification method, then the user unit and/or an enterprise unit (among others) may group or section off one or more applications that may be currently unavailable to user A (e.g., a nurse), but would otherwise be available to user B (e.g., a doctor) and/or user A at a later time, including after a promotion, an advancement, a period of time (e.g., 6 months), a training program, a certification, etc.

Figure 11:
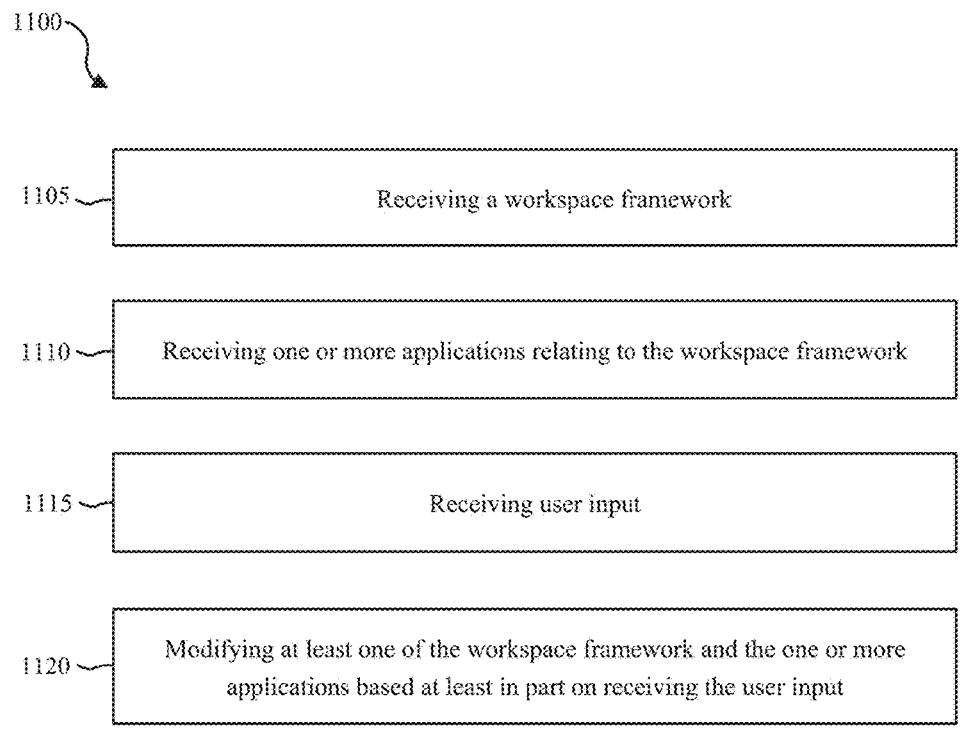
FIG. 11 is a block diagram illustrating embodiments of methods relating to dynamic workspace modification applications.

FIG. 11 shows exemplary methods 1100 and systems in accordance with some embodiments. In some embodiments, methods incorporating the present systems and methods may include receiving a workspace framework, receiving one or more applications relating to the workspace framework, receiving user input, and/or modifying at least one of the workspace framework and the one or more applications based at least in part on receiving the user input—as shown in blocks 1105, 1110, 1115, and 1120. In some embodiments, any and/or all of these operations may be performed by, or at, one or more of: a user unit, an enterprise unit, a source unit, a network, a database, and/or other components, elements, and/or modules.

In some embodiments, modifying an application may include modifying, adding, amending, changing, adjusting, and/or omitting one or more elements of one or more workspaces and/or applications, which may in some embodiments be secure.

In some embodiments, a secure communication connection may exist between one or more elements and may be based at least in part on an authentication operation performed at and/or by one or more of user units, enterprise units, and/or other units. In some embodiments, different, discreet communication connections may exist in parallel, in series, in different relationships, and/or some combination.

Figure 12:
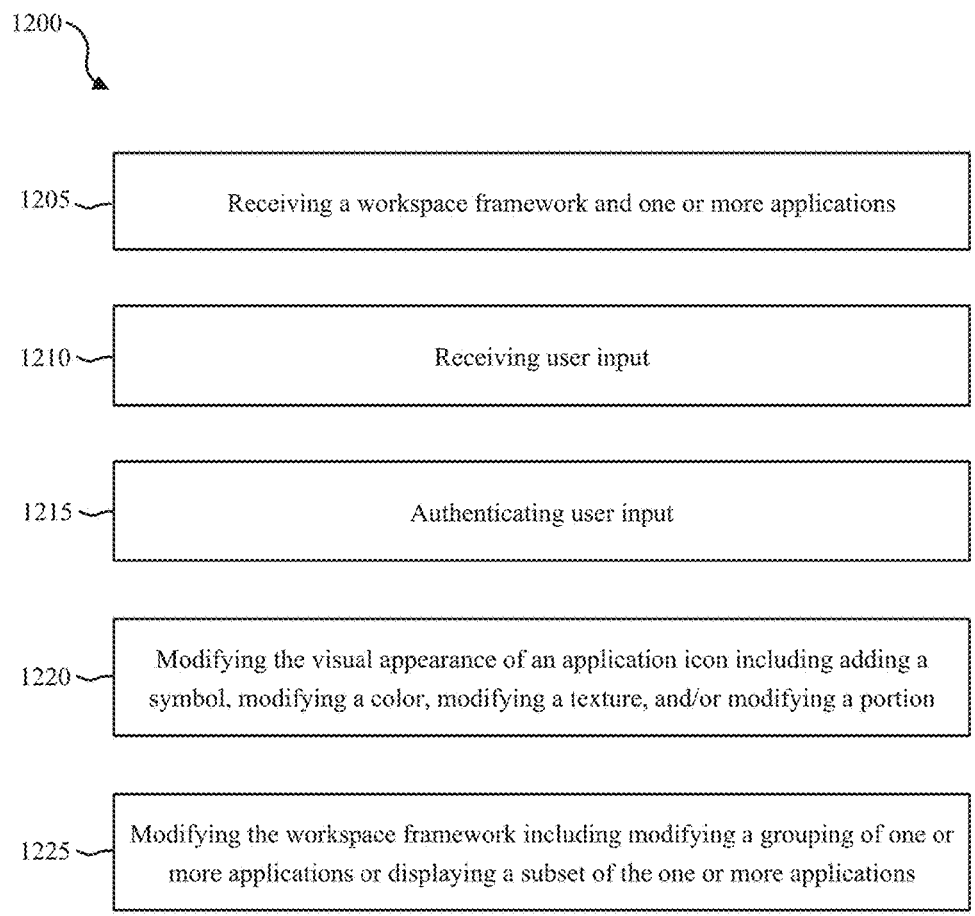
FIG. 12 is a block diagram illustrating embodiments of methods relating to dynamic workspace modification applications.

FIG. 12 shows exemplary methods 1200 and systems in accordance with some embodiments. In some embodiments, methods incorporating the present systems and methods may include receiving a workspace framework, receiving user input, authenticating user input, modifying the visual appearance of an application icon including adding a symbol, modifying a color, modifying a texture, and/or modifying a portion, and/or modifying the workspace framework including modifying a grouping of one or more applications or displaying a subset of the one or more applications—as shown in blocks 1205, 1210, 1215, 1220, and 1225. In some embodiments, any and/or all of these operations may be performed by, or at, one or more of: a user unit, an enterprise unit, a source unit, a network, a database, and/or other components, elements, and/or modules.

Figure 13:
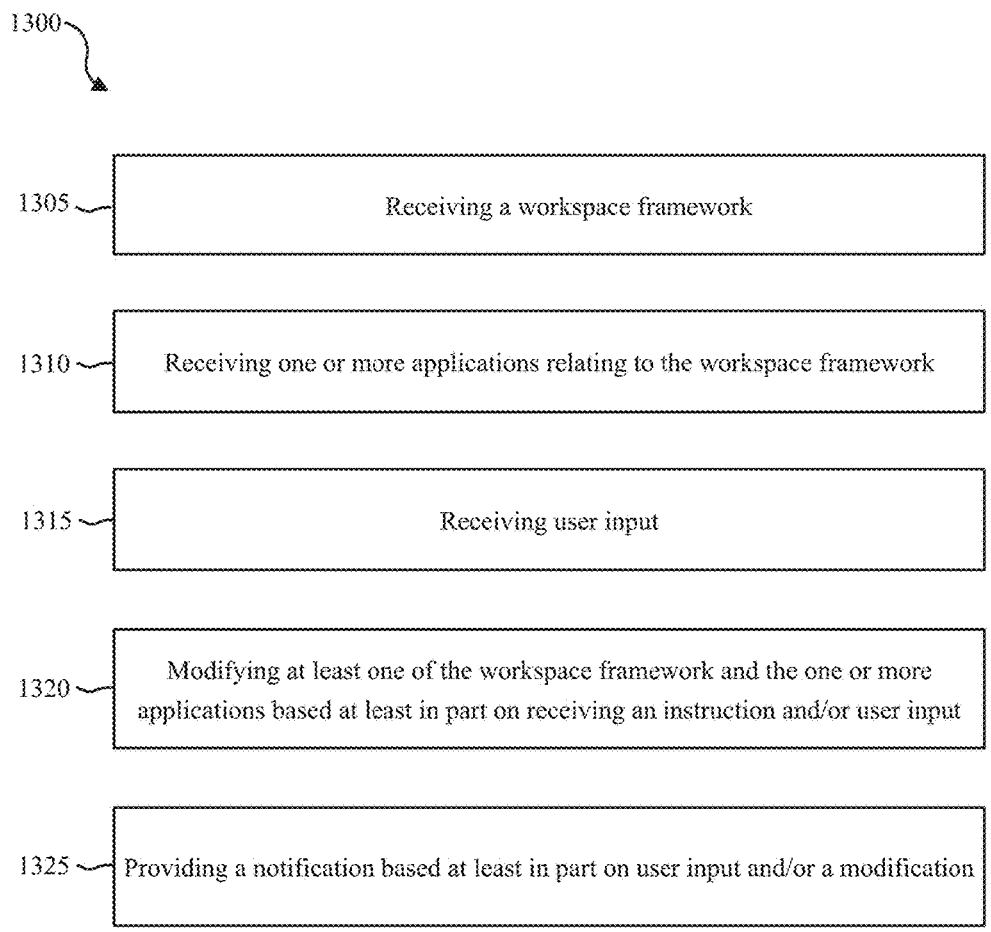
FIG. 13 is a block diagram illustrating embodiments of methods relating to dynamic workspace modification applications.

FIG. 13 shows exemplary methods 1300 and systems in accordance with some embodiments. In some embodiments, methods incorporating the present systems and methods may include receiving a workspace framework, receiving one or more applications relating to the workspace framework, receiving user input, modifying at least one of the workspace framework and the one or more applications based at least in part on receiving an instruction and/or user input, and/or providing a notification based at least in part on a user input and/or a modification—as shown in blocks 1305, 1310, 1315, 1320, and 1325. In some embodiments, providing a notification may be based at least in part on an instruction, a user input, and/or a modification In some embodiments, any and/or all of these operations may be performed by, or at, one or more of: a user unit, an enterprise unit, a source unit, a network, a database, and/or other components, elements, and/or modules.

In some embodiments, the modifying may be based on receiving an instruction and/or a user input, among other things. These one or more instructions may be received by and/or transmitted from a user unit, an enterprise unit, a user, and/or some other device and/or method. For example, the user unit may receive an instruction from an enterprise unit to modify one or more workspaces and/or applications and the user unit may perform one or more modifications based at least in part on the instruction received. In some embodiments, the enterprise unit may receive an instruction and/or a request from a user unit (which may be based on a user input about preferences, credentials, profile, needs for a document, and/or other information). The enterprise unit may then perform any modification requested and/or instructed, may reject the request and/or the instruction based on one or more parameters, characteristics, preferences, etc., may transmit modification-related information to the user unit that may perform the modification, some combination of these scenarios, and/or other related functions.

In some embodiments, one component of the system may provide a notification based at least in part on user input and/or a modification. This notification regarding a modification may be provided to: the user via a display of user unit, a user unit itself, an enterprise unit a source unit, a database, some combination of these, and/or to another component and/or element of a related system. This notification may relate to a status of a modification (completed, in process, etc.), the receipt of an instruction by and associated operations, the rejection of an instruction and/or a request, required and/or preferred additional information, indicate a timeframe relating to an expected modification, and/or some other information.

Figure 14:
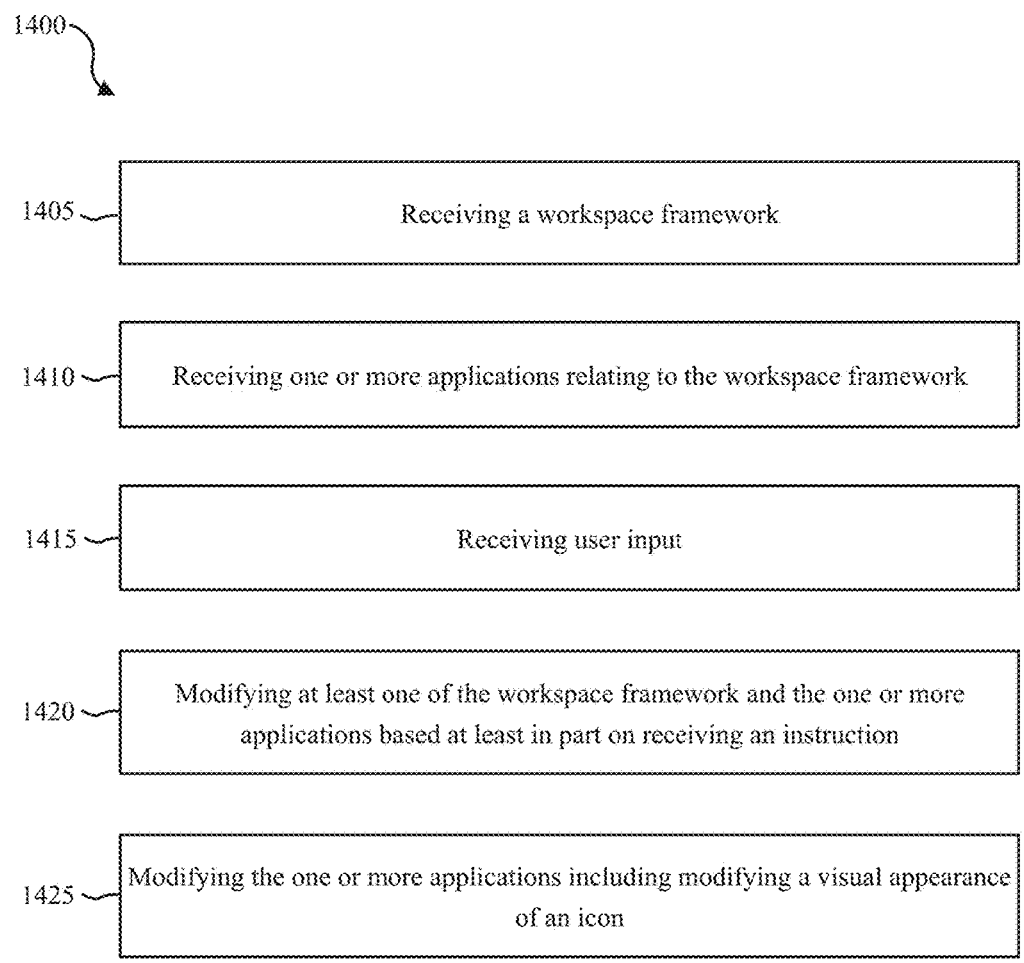
FIG. 14 is a block diagram illustrating embodiments of methods relating to dynamic workspace modification applications.

FIG. 14 shows exemplary methods 1400 and systems in accordance with some embodiments. In some embodiments, methods incorporating the present systems and methods may include receiving a workspace framework, receiving one or more applications relating to the workspace framework, receiving user input, modifying at least one of the workspace framework and the one or more applications based at least in part on receiving an instruction, and/or modifying the one or more applications including modifying a visual appearance of an icon—as shown in blocks 1405, 1410, 1415, 1420, and 1425. In some embodiments, any and/or all of these operations may be performed by, or at, one or more of: a user unit, an enterprise unit, a source unit, a network, a database, and/or other components, elements, and/or modules.

While this disclosure sets forth various embodiments using specific block diagrams, flowcharts, and examples, each block diagram component, flowchart step, operation, and/or components described and/or illustrated here may be implemented—individually and/or collectively—using a wide range of hardware, software, and/or firmware (or any combination thereof) configurations. In addition, any disclosure of components contained within other components should be considered exemplary in nature since many other architectures can be implemented to achieve the same functionality, including combining multiple elements in one or more unitary structures (e.g., a unitary housing, an integrated housing, etc.) and/or separate structures.

The process parameters and sequence of steps described and/or illustrated here are given by way of example only and can be varied as desired. For example, while the steps illustrated and/or described herein may be shown or discussed in a particular order, these steps do not necessarily need to be performed in the order illustrated or discussed. The various exemplary methods described and/or illustrated here may also omit one or more of the steps described and/or illustrated, and/or may include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

This description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, the discussion of a single element, operation, and/or idea, including an application and/or a workspace, should not be construed as being limited to the single element, operation, and/or idea, but may also include multiple elements, operations, and/or ideas. In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for providing a dynamic modification relating to an electronic device, comprising:
   receiving a workspace framework comprising a symbol that indicates one or more permissions for a user associated with the electronic device;
   receiving one or more applications relating to the workspace framework;
   receiving user input, the user input including authentication information associated with the user;
   comparing the authentication information associated with the user with the symbol based at least in part on receiving the user input;
   identifying a permission level for the user based at least in part on comparing the authentication information with the symbol;
   determining that the user has permission to access a first subset of the one or more applications relating to the workspace framework based at least in part on the identified permission level;
   determining that access to a second subset of the one or more applications relating to the workspace framework is restricted based at least in part on the identified permission level;
   displaying the workspace framework including displaying the first subset of the one or more applications based at least in part on the determination the user has permission to access the first subset;
   restricting display of the second subset based at least in part on the determination that access to the second subset is restricted;
   receiving a request for a modified workspace framework, the request being based at least in part on the displayed workspace framework;
   determining an updated permission level for the user based at least in part on the received request;
   determining that a previously inaccessible application is available for the user to access based at least in part on the updated permission level;
   modifying the first subset of the one or more applications to add the previously inaccessible application and modifying the second subset of the one or more applications to remove the previously inaccessible application; and
   modifying the workspace framework to display the modified first subset of the one or more applications and restrict display of the modified second subset of the one or more applications, based at least in part on determining the availability of the previously inaccessible application.

2. The method of claim 1, wherein modifying the workspace framework comprises:
   modifying a visual appearance of an icon of at least some of the one or more applications.

3. The method of claim 2, wherein modifying the visual appearance of the icon comprises:
   modifying an outline of the icon.

4. The method of claim 2, wherein, modifying the visual appearance of the icon comprises:
   adding a symbol to the icon.

5. The method of claim 2, wherein modifying the visual appearance of the icon comprises:
   modifying a portion of the icon.

6. The method of claim 2, wherein modifying the visual appearance of the icon comprises:
   modifying a color of the icon.

7. The method of claim 2, wherein modifying the visual appearance of the icon comprises:
   modifying a texture of the icon.

8. The method of claim 1, wherein modifying the workspace framework comprises:
   modifying a grouping of the one or more applications.

9. The method of claim 1, wherein modifying the workspace framework is based at least in part on comparing profile data associated with the user input to identify the permission level related to the workspace framework.

10. The method of claim 1, wherein each of the one or more applications relating to the workspace framework is a secure application.

11. The method of claim 1, further comprising:
    providing a notification based at least in part on the user input.

12. The method of claim 1, further comprising:
    providing a notification based at least in part on the modifying.

13. The method of claim 1, further comprising:
    authenticating the user input,
    wherein the user input comprises at least one of a user identifier or a password.

14. The method of claim 1, wherein modifying the workspace framework is performed based at least in part on receiving information from a remote server.

15. A computing device for providing a dynamic modification, comprising:
    a processor;
    memory in electronic communication with the processor, wherein the memory stores computer executable instructions that when executed by the processor cause the processor to perform the steps of:
       receiving a workspace framework comprising a symbol that indicates one or more permissions for a user associated with the electronic device;
       receiving one or more applications relating to the workspace framework;
       receiving user input, the user input including authentication information associated with the user;
       comparing the authentication information associated with the user with the symbol based at least in part on receiving the user input;
       identifying a permission level for the user based at least in part on comparing the authentication information with the symbol;
       determining that the user has permission to access a first subset of the one or more applications relating to the workspace framework based at least in part on the identified permission level;
       determining that access to a second subset of the one or more applications relating to the workspace framework is restricted based at least in part on the identified permission level;

displaying the workspace framework including displaying the first subset of the one or more applications based at least in part on the determination the user has permission to access the first subset;

restricting display of the second subset based at least in part on the determination that access to the second subset is restricted;

receiving a request for a modified workspace framework, the request being based at least in part on the displayed workspace framework;

determining an updated permission level for the user based at least in part on the received request;

determining that a previously inaccessible application is available for the user to access based at least in part on the updated permission level;

modifying the first subset of the one or more applications to add the previously inaccessible application and modifying the second subset of the one or more applications to remove the previously inaccessible application; and modifying the workspace framework to display the modified first subset of the one or more applications and restrict display of the modified second subset of the one or more applications, based at least in part on determining the availability of the previously inaccessible application.

16. The computing device of claim 15, wherein modifying the workspace framework comprises:

modifying an icon of at least some of the one or more applications.

17. The computing device of claim 15, wherein modifying the workspace framework comprises:

modifying an icon based at least in part on at least in part on a characteristic of another icon.

18. The computing device of claim 15, wherein modifying the workspace framework comprises:

differentiating the first subset of the one or more applications from the second subset of the one or more applications.

19. A non-transitory computer-readable storage medium storing computer executable instructions that when executed by a processor cause the processor to perform the steps of:

receiving a workspace framework comprising a symbol that indicates one or more permissions for a user associated with the electronic device;

receiving one or more applications relating to the workspace framework;

receiving user input, the user input including authentication information associated with the user;

comparing the authentication information associated with the user with the symbol based at least in part on receiving the user input;

identifying a permission level for the user based at least in part on comparing the authentication information with the symbol;

determining that the user has permission to access a first subset of the one or more applications relating to the workspace framework based at least in part on the identified permission level;

determining that access to a second subset of the one or more applications relating to the workspace framework is restricted based at least in part on the identified permission level;

displaying the workspace framework including displaying the first subset of the one or more applications based at least in part on the determination the user has permission to access the first subset;

restricting display of the second subset based at least in part on the determination that access to the second subset is restricted;

receiving a request for a modified workspace framework, the request being based at least in part on the displayed workspace framework;

determining an updated permission level for the user based at least in part on the received request;

determining that a previously inaccessible application is available for the user to access based at least in part on the updated permission level;

modifying the first subset of the one or more applications to add the previously inaccessible application and modifying the second subset of the one or more applications to remove the previously inaccessible application; and modifying the workspace framework to display the modified first subset of the one or more applications and restrict display of the modified second subset of the one or more applications, based at least in part on determining the availability of the previously inaccessible application.

* * * * *